UNITED STATES PATENT OFFICE.

THEODORE B. E. TURRETTINI, OF GENEVA, SWITZERLAND.

IMPROVEMENT IN PROCESSES OF TREATING WATER TO PRODUCE CLEAR ICE.

Specification forming part of Letters Patent No. 196,316, dated October 23, 1877; application filed July 20, 1877.

*To all whom it may concern:*

Be it known that I, THEODORE BENEDICT EDOUARD TURRETTINI, of Geneva, in the Republic of Switzerland, have invented certain Improvements in the Method of Treating Water to Produce Clear Ice, of which the following is a specification:

The object of my invention is to secure the production, in ice-making machines, of ice which will be clear and free from the air-bubbles which are generally to be found in artificially-made ice; and to this end the invention consists in passing a current of air or suitable gas through the water to be frozen, for the purpose of agitating the same and releasing and driving out the contained air.

I am aware that various attempts have been made to secure this result by agitating the water in the molds, during or immediately previous to its congelation, by mechanical agitators, and by causing a circulation; and a patent has also been recently granted to me in France for subjecting the water to a vacuum while being agitated; but said methods are all objectionable for different reasons, among which is the serious one that when used on a large scale they necessitate the use of complicated and expensive machinery.

My present plan possesses the advantage of extreme cheapness and simplicity, combined with that of an efficiency exceeding that of either of the other plans.

The construction of the ice-machine proper, and of the apparatus for carrying out my invention therein, may be varied at will, and have no bearing on my present invention.

Any apparatus may be used in carrying out my method or process which will secure the passage of air or gas through the water, and permit its free escape therefrom, a simple arrangement being to connect, with a blowing-engine, pipes which extend down into the molds of the ice-machine nearly to their lower ends. The air escaping from the pipes ascends rapidly through the water in the form of large bubbles, having great buoyancy and a strong upward tendency, and which escape in quick succession at the surface. These bubbles encounter, in their upward course, the small bubbles or globules of air held in suspension in the water or adhering to the walls of the mold, and the result is that the small bubbles coalesce with the large, and both ascend and escape together, the air from the pump thus taking up and conveying out the air held in suspension or solution by the water. The inflowing air also serves to violently agitate the water in the mold, and in that way serves to release a portion of the contained air, which will rapidly ascend and escape as soon as the water is set in motion and the equilibrium destroyed.

In order to secure the full success of the process, the supply of air must, of course, be continued up to the instant of congelation. The essential point to be observed is, that the air or its equivalent is passed through the water and permitted to escape freely therefrom; and so long as this is done the apparatus and its mode of action may be varied at will.

Having thus described my invention, what I claim is—

1. The method of securing the production of clear ice in ice-machines, by passing a current of air or gas through the water to be frozen, substantially as described.

2. The method of treating water to produce clear ice, consisting in passing air or gas through the same while being subjected to refrigeration.

THEODORE BENEDICT EDOUARD TURRETTINI.

Witnesses:
    ALBERT TURRETTINI,
    LYELL ADAMS.